United States Patent Office 2,892,835
Patented June 30, 1959

2,892,835
CYANINE DYES CONTAINING A SATURATED HETEROCYCLIC NUCLEUS

George de Stevens, Portland, Conn., assignor to Sperry Rand Corporation, a corporation of Delaware No Drawing. Application May 10, 1955
Serial No. 507,460

13 Claims. (Cl. 260—240.4)

My invention relates to the synthesis of a new thiazole, 2,7-dimethyl-4-isopropyl-4,5,6,7-tetrahydrobenzothiazole having the following structure:

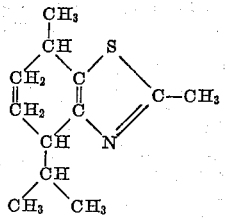

and to cyanine dyes derived therefrom.

Cyanine dyes contain at least two auxochromic nitrogen atoms, the one ternary and the other quaternary, the one nitrogen atom lying in one heterocyclic nucleus and the other lying in another heterocyclic nucleus, the two nitrogen atoms being connected by a conjugated carbon chain.

I have now found that it is possible to prepare cyanine dyes in which one or both of the above mentioned auxochromic nitrogen atoms lie in a 7-methyl-4-isopropyl-4,5,6,7-tetrahydrobenzothiazole nucleus. I have further found that these new cyanine dyes sensitize photographic emulsions strongly and cleanly, i.e. without producing excessive fog or residual dye stain.

It is accordingly an object of my invention to provide new cyanine dyes. A further object is to provide photographic emulsions sensitized with such dyes. Other objects will appear hereinafter.

As starting material for the preparation of my new dyes I employ 2,7-dialkyl-4-isopropyl-4,5,6,7-tetrahydrobenzothiazoles, particularly 2,7-dimethyl-4-isopropyl-4,5,6,7-tetrahydrobenzothiazole. I first convert the new thiazole base to quaternary salts by reacting the base with esters, such as alkyl halides, alkyl sulfates, or alkyl-p-toluene sulfonates, for example. For purposes of convenience the quaternary salts useful in practicing this invention can be represented by the following single formula:

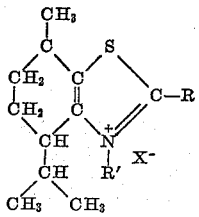

wherein R' represents an alkyl group, e.g. methyl, ethyl, n-propyl, isobutyl, n-butyl, β-hydroxyethyl, β-methoxyethyl, α-ethoxyethyl, β-acetoxyethyl, β-carboxyethyl, carboxymethyl, β-carbomethoxyethyl, β-carbethoxyethyl, allyl, etc. or an aralkyl group, e.g. benzyl, phenyl, ethyl, etc., R represents methyl, ethyl or n-propyl and X⁻ represents an anion, e.g. chloride, bromide, iodide, benzene sulfonate, p-toluene sulfonate, methyl sulfate, ethyl sulfate, thiocyanate perchlorate, acetate, etc.

To prepare pseudocyanine dyes from such quaternary salts I react the quaternary salts with 2-halogenoquinoline quaternary salts, in the presence of an acid binding agent, such for example, as sodium ethylate, sodium carbonate, pyridine or a strong organic base (e.g. triethylamine, trimethylamine and N-methylpiperidine). I have found it advantageous to employ a mixture or pyridine with a strong tertiary organic base.

Instead of 2-halogenoquinoline quaternary salts I can employ 2-alkyl mercapto or 2-aryl mercaptoquinoline quaternary salts to condense with the quaternary salts of 2-alkyl-4-isopropyl-7-methyl-4,5,6,7-tetrahydrobenzothiazole in the presence of an acid binding agent.

Using 2-halogenopyridine quaternary salts instead of 2-halogenoquinoline quaternary salts I can prepare pyridocyanine dyes containing a 4-isopropyl-7-methyl-4,5,6,7-tetrahydrobenzothiazole nucleus.

Using 2-alkyl mercapto or 2-aryl mercaptobenzothiazole or naphthothiazole salts I can prepare simple cyanine dyes other than pseudocyanine dyes.

To prepare symmetrical carbocyanine dyes from 2-alkyl-4-isopropyl-7-methyl-4,5,6,7-tetrahydrobenzothiazole quaternary salts, I react the quaternary salts with esters of ortho acids, e.g. ethyl orthoformate, ethyl orthoacetate, ethyl orthopropionate and ethyl orthobenzoate in the presence of pyridine or a mixture of pyridine and triethylamine.

To prepare unsymmetrical carbocyanine dyes from 2-alkyl-4-isopropyl-7-methyl-4,5,6,7-tetrahydrobenzothiazole quaternary salts I react the quaternary salts with cycloammonium quaternary salts containing a β-aryl aminovinyl group in the alpha or gamma position, i.e. in one of the so-called reactive positions in the presence of an acid binding agent, e.g. pyridine or pyridine plus triethylamine.

To prepare styryl dyes from my new quaternary salts I condense them with p-dialkyl aminobenzaldehyde in the presence of an alkaline catalyst, e.g. piperidine in absolute ethanol solution.

To prepare merocarbocyanine dyes from 2-alkyl-4-isopropyl-7-methyl 4,5,6,7-tetrahydrobenzothiazole quaternary salts I condense the quaternary salts with ketomethylene heterocyclic intermediates containing an aryl amino-methylene group in the 5 position in the presence of an acid binding agent, e.g. pyridine plus triethylamine. Examples of such ketomethylene intermediates are 5-acetanilidomethylene-3-ethyl rhodanine, 5-acetanilidomethylene-3-ethyl-1-phenyl-2-thiohydantoin, etc.

It is well known that cyanine dyes resonate between two extreme forms and that a cyanine dye can be represented by either of the two extreme forms. Thus, the unsymmetrical type of instant dyes can be represented by either of the following formulas:

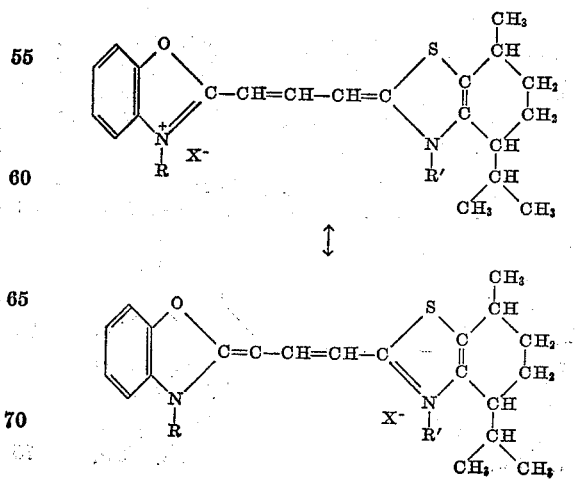

The following examples will serve to illustrate my invention and the method of preparation of the dyes.

*Example I.—Preparation of 2,7-dimethyl-4-isopropyl-4,5,6,7-tetrahydrobenzothiazole*

100 g. (1 mol) of monobromomenthone (from dl-menthone according to Yanovskaya et al., Zhur. Obshchei Khim 22, 1594 (1952) C.A. 47, 8032 (1953)), and 35 g. (1 mol) of thioacetamide were heated slowly up to 135°. A vigorous reaction ensued and the reaction mixture was cooled. The mixture was again heated to 135° followed by external cooling in order to control the resulting vigorous reaction. This was continued until the reaction no longer proceeded of itself. It was then heated on the steam bath for one hour. On cooling, 100 ml. of water was added to the mixture which is then made alkaline with NH$_4$OH and extracted with ether. After drying the ether extract over K$_2$CO$_3$, the ether was removed by distillation and the residue was distilled at reduced pressure, the product being collected at 127°–128°/14 mm. Yield: 20.0 g. 23% of theoretical.

*Example II.—Preparation of 2,7-dimethyl-4-isopropyl-4,5,6,7-tetrahydrobenzothiazole methyl p-toluene sulfonate*

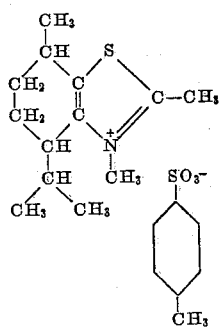

8 g. (1 mol) 2,7-dimethyl-4-isopropyl-4,5,6,7-tetrahydrobenzothiazole and 8.3 g. (1 mol.+10% excess) of methyl p-toluene sulfonate were heated at 120° in an oil bath for 3 days. After cooling, the viscous mixture was washed well with ether. Since this mixture was found to be very soluble in acetone, the ether washed residue was used directly in the synthesis of dyes.

*Example III.—Preparation of 2,7-dimethyl-4-isopropyl-4,5,6,7-tetrahydrobenzothiazole ethiodide*

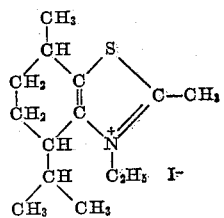

10 g. (1 mol) of 2,7-dimethyl-4-isopropyl-4,5,6,7-tetrahydrobenzothiazole and 10 g. (1 mol.+10% excess) of ethyl iodide were heated on the steam bath for 3 days. On cooling, it was washed well with ether and used as such for the preparation of dyes.

*Example IV.—Preparation of 3,3',7,7'-tetramethyl-4,4'-diisopropyl - 4,4',5,5',6,6',7,7' - octahydro - thiacarbocyanine perchlorate*

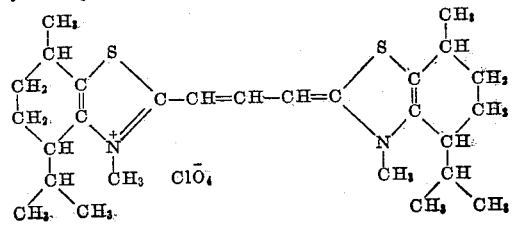

5.0 g. (1 mol) of 2,7-dimethyl-4-isopropyl-4,5,6,7-tetrahydrobenzothiazole methyl p-toluene sulfanate, 5.2 g. (1 mol.+200% excess) of ethyl orthoformate, 20 ml. of absolute pyridine and 3 g. of triethylamine were refluxed for 5½ hours. After cooling, the solution was diluted with 400 ml. of ether. The ether was decanted and the residue was washed several times with fresh portions of ether. The residue was then added to 100 ml. of a 5% solution of sodium perchlorate. The crystalline precipitate was collected on a filter, washed well with water and air dried to give 17% yield of crude dye. After two crystallizations from propanol (2 ml. per gram), 1.5% yield of pure dye was obtained in the form of tiny green crystals, melting at 238° with decomposition.

A methanol solution of the dye was reddish blue with an absorption maximum at 572 mu.

*Example V.—Preparation of 1'-ethyl-3,7-dimethyl-4-isopropyl-4,5,6,7-tetrahydro-thia-2'-cyanine iodide*

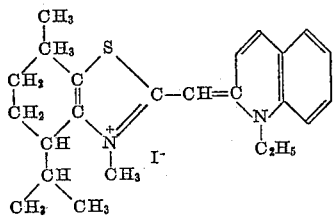

2 g. (1 mol.) of 2,7-dimethyl-4-isopropyl-4,5,6,7-tetrahydrobenzothiazole methyl p-toluene sulfonate, 2 g. (1 mol.) of 2-iodoquinoline ethiodide, 1 g. (1 mol.+100% excess) of triethylamine and 20 ml. of absolute ethyl alcohol were refluxed for 20 minutes. After cooling, the mixture was diluted with 400 ml. of ether. The ether was decanted and the viscous residue was washed several times with fresh portions of ether. The semicrystalline residue was taken up in 15 ml. of methanol and chilled. The crude dye was collected on a filter and washed well with water. After three recrystallizations, from methanol (100 ml. per 1 g. of dye) a 6% yield of pure dye, melting at 240° with decomposition, was obtained.

A methanol solution of the dye was yellow and exhibited an absorption maximum at 484 mu.

*Example VI.—Preparation of 3-ethyl-3',7',9-trimethyl-4'-isopropyl-4',5',6',7'-tetrahydrothiacarbocyanine iodide*

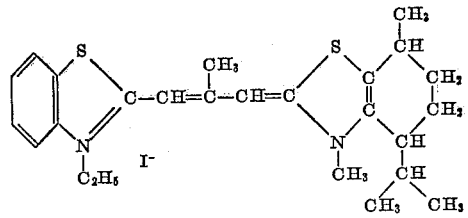

2.0 g. (1 mol.) of 2,7-dimethyl-4-isopropyl-4,5,6,7-tetrahydrobenzothiazole methyl p-toluene sulfonate, 2.2 g. (1 mol) 2-(2-methylmercaptopropenyl) benzothiazole ethyl p-toluene sulfonate, 20 cc. of absolute ethyl alcohol and 1 g. of triethylamine were refluxed for 25 minutes. 3 g. of sodium iodide dissolved in 10 ml. of ethyl alcohol was added to the hot reaction mixture and the whole was chilled. The precipitate was collected on a filter, washed well with water, then acetone, and air dried. After two recrystallizations from methanol (75 ml. per gram) the pure dye, melting at 238° with decomposition, was obtained in 9% yield.

A methanol solution of the dye was red in color and exhibited an absorption maximum at 540 mu.

*Example VII.—3,3'-diethyl-7'-methyl-4'-isopropyl 4',5',6', 7'-tetrahydro-oxathiacarbocyanine iodide*

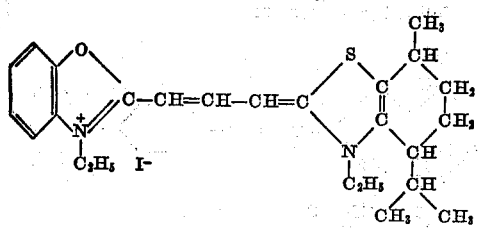

1.9 g. (1 mol.) of 2,7-dimethyl-4-isopropyl-4,5,6,7-tetrahydrobenzothiazole ethiodide, 2.4 g. (1 mol.) of 2-β-acetanilidovinyl benzoxazole ethiodide, 10 ml. of absolute ethyl alcohol and 1 g. of triethylamine were refluxed for 15 minutes. The chilled solution was diluted with 300 ml. of ether, the ether was decanted and the residue was washed several times with ether and then water. After drying in vacuo the yield of crude dye was 26%. After two recrystallizations from butanol (10 ml. per gram), the pure dye, melting at 235° with decomposition, was obtained in 6% yield. A methanol solution of the dye was orange red with an absorption maximum at 517 mu.

*Example VIII.—3 - ethyl-5-[3,7 - dimethyl - 4 - isopropyl-4,5,6,7-tetrahydro-2(3)-benzothiazolylidene)ethylidene]-rhodanine*

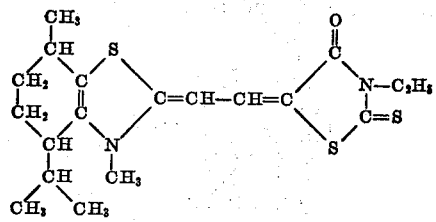

2 g. (1 mol.) of 2,7-dimethyl-4-isopropyl-4,5,6,7-tetrahydrobenzothiazole methyl p-toluene sulfonate, 1.5 g. (1 mol.) of 5-acetanilidomethylene-3-ethyl rhodanine, 10 ml. of absolute pyridine and 1 g. of triethyl amine were refluxed for 20 minutes. On cooling, 50 ml. of methanol was added to the reaction mixture. After chilling overnight, the dye crystals were collected on a filter, washed with methanol and dried in vacuo. The dye was recrystallized by dissolving it in pyridine and precipitating by the addition of methanol. The yield of pure dye, melting at 188°–189° with decomposition, was 10%.

A methyl alcohol solution of the dye was red with an absorption maximum at 550 mu.

*Example IX.—2 - p - dimethylaminostyryl - 7 - methyl - 4 - isopropyl - 4,5,6,7 - tetrahydrobenzothiazole methiodide*

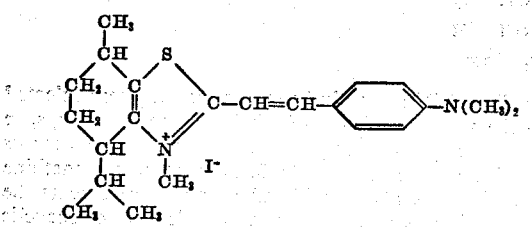

2 g. (1 mol.) of 2,7-dimethyl-4-isopropyl-4,5,6,7-tetrahydrobenzothiazole methyl-p-toluene sulfonate, 0.8 g. (1 mol.) of p-dimethylaminobenzaldehyde, and 20 cc. of absolute ethyl alcohol to which was added a few drops of piperidine, were refluxed for 25 minutes. To the hot reaction mixture was added 3 g. of sodium iodide dissolved in 10 ml. of absolute ethyl alcohol and the whole was chilled. The precipitate was collected on a filter, washed well with water, then acetone, and air dried. The yield of crude dye was 10%. After two recrystallizations from methyl alcohol (60 ml. per gram) the pure dye was obtained in 4% yield, m.p. 228°–230° d.

A methanol solution of the dye was colored orange with an absorption maximum at 490 mu.

To sensitize photographic silver halide emulsions with my new dyes, I disperse the dyes in the emulsions. My invention is particularly directed to the customarily employed gelatino-silver-halide emulsions, such as the gelatino-silver-bromide, bromiodide, chloride and chlorobromide for example. The methods of incorporating dyes in emulsions are simple and well known to those skilled in the art, and described in various patents and publications, for example, U.S. Patent No. 2,336,843, patented December 14, 1943.

The features of novelty which I believe to be characteristic of my invention are set forth with particularity in the following claims. It should be understood, however, that modifications and changes may be made, without departing from the spirit and substance of my invention, as will be apparent to those skilled in the art.

What I claim as my invention and desire to be secured by Letters Patent of the United States is:

1. A dye selected from the group characterized by the following general formula:

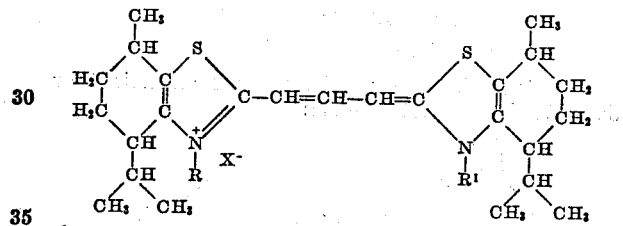

where R and R' respectively represent members selected from the group consisting of alkyl and aralkyl groups, and X⁻ represents an acid radical.

2. 3,3',7,7'-tetramethyl-4,4'-diisopropyl-4,4',5,5',6,6',7,7'-octahydrothiacarbocyanine perchlorate having the following structure:

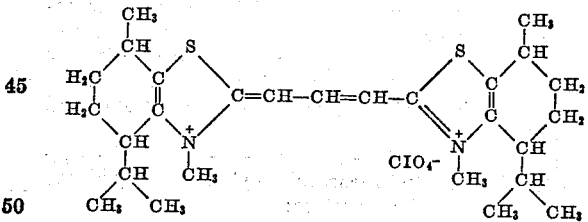

3. A dye selected from the group characterized by the following general formula:

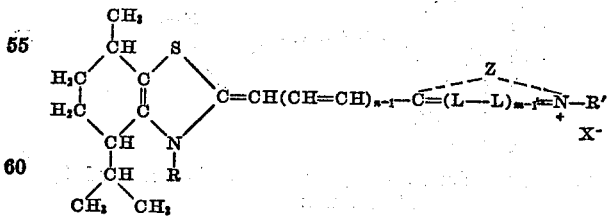

wherein R and R' respectively represent members selected from the group consisting of alkyl and aralkyl groups, $m$ represents a positive integer from 1 to 2, $n$ represents a positive integer from 1 to 3, L represents a methine group, X represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series.

4. 3,3' - diethyl - 4' - isopropyl - 7' - methyl - 4',5',6',7'-tetrahydro-oxathiacarbocyanine iodide.

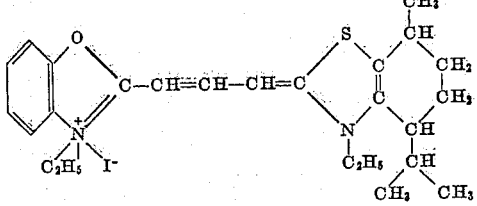

5. 1' - ethyl - 3,7 - dimethyl - 4 - isopropyl - 4,5,6,7-tetrahydrothia-2'-cyanine iodide.

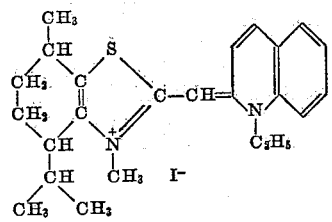

6. A dye selected from the group characterized by the following general formula:

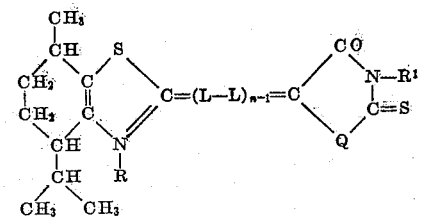

where R is a member selected from the group consisting of alkyl and aralkyl groups, R' is a member selected from the group consisting of alkyl, aralkyl, and aryl groups, L is a methane group, $n$ is a positive integer of from 1 to 4 and Q is a member selected from the group consisting of oxygen, sulfur, selenium and =N—R'.

7. 3 - ethyl - 5 - [(3,7 - dimethyl - 4 - isopropyl - 4,5,6,7 - tetrahydro - 2(3)benzothiazolylidene) ethylidene] rhodanine having the structure:

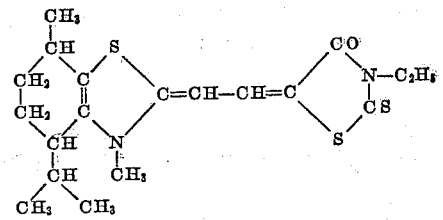

8. A dye selected from the group characterized by the following general formula:

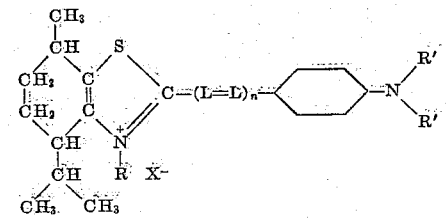

where R and R' represent a member selected from the group consisting of alkyl and aralkyl groups, L represents a methine group, $n$ is a positive integer from one to two, and X⁻ represents an acid radical.

9. 2 - p - dimethylaminostyryl - 7 - methyl - 4 - isopropyl 4,5,6,7,-tetrahydrobenzothiazole methiodide having the following structure:

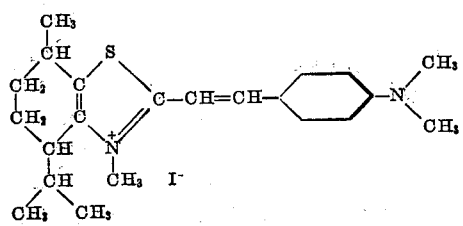

10. A process for preparing symmetrical carbocyanine dyes having the general formula:

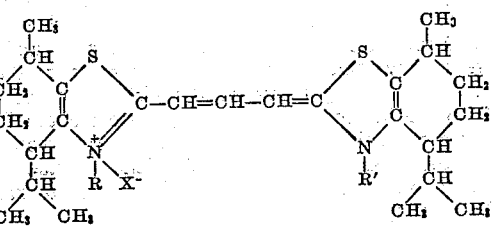

where R and R' respectively represent members selected from the group consisting of alkyl and aralkyl groups, and X⁻ represents an acid radical from a quaternary salt having the general formula:

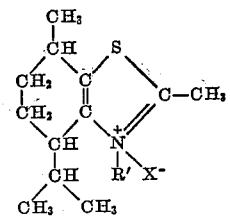

where R' represents a member selected from the group consisting of alkyl and aralkyl groups and X⁻ represents an anion comprising condensing the quaternary salt with an ester of an orthocarboxylic acid in an alkaline medium containing at least one constituent selected from the group consisting of pyridine and a mixture of pyridine and triethylamine.

11. A process for preparing unsymmetrical cyanine dyes having the general formula:

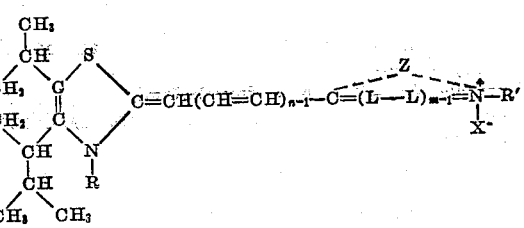

where R and R' respectively represents members selected from the group consisting of alkyl and aralkyl groups, $m$ represents a positive integer from 1 to 2, $n$ represents a positive integer from 1 to 3, L represents a methine group, X represents an acid radical and Z represents the non-metallic atoms necessary to complete a heterocyclic nucleus containing from 5 to 6 atoms in the heterocyclic ring, said heterocyclic nucleus being selected from the group consisting of a nucleus of the oxazole series, a nucleus of the thiazole series, a nucleus of the thiazoline series, a nucleus of the benzoxazole series, a nucleus of the benzothiazole series, a nucleus of the alpha naphthoxazole series, a nucleus of the beta naphthoxazole series, a nucleus of the alpha naphthothiazole series, a nucleus of the beta naphthothiazole series, a nucleus of the selenazole series, a nucleus of the pyridine series, and a nucleus of the 3,3-dialkyl indolenine series from a quaternary salt having the general formula:

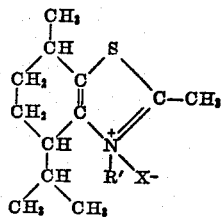

where R' represents a member selected from the group consisting of alkyl and aralkyl groups and X⁻ represents an anion comprising condensing said quaternary salt with a heterocyclic ammonium quaternary salt having a reactive constituent selected from the group consisting of aryl aminovinyl groups, aryl aminobutadienyl groups, halogen atoms and thioether groups in a position selected from the alpha and gamma positions with respect to the nitrogen atom in the heterocyclic ring of said heterocyclic ammonium quaternary salt in the presence of an alkaline condensing agent.

12. A process for preparing merocarbocyanine dyes containing the 2-alkyl-4-isopropyl-7-methyl-4,5,6,7-tetrahydrobenzothiazole nucleus and having the general formula:

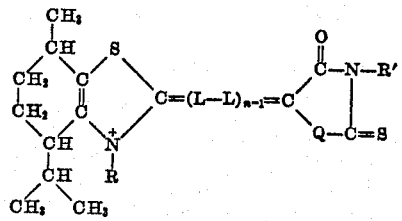

wherein R represents a member selected from the group consisting of alkyl and aralkyl groups, R' represents a member selected from the group consisting of alkyl, aralkyl and aryl groups, L is a methine group, $n$ is a positive integer from 1 to 4 and Q is a member selected from the group consisting of oxygen, sulfur, selenium and =N-R' comprising condensing a quaternary salt having the general formula

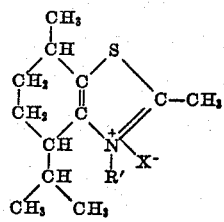

where R' represents a member selected from the group consisting of alkyl and aralkyl groups and X⁻ represents an anion with a ketomethylene heterocyclic compound having the ketomethylene heterocyclic ring of said merocarbocyanine dye and having a reactive arylaminomethylene group in the 5-position with respect to the member represented by Q in the depicted general formula for said merocarbocyanine dye in an alkaline medium.

13. A process for preparing styryl dyes containing the 2-alkyl-4-isopropyl-7-methyl - 4,5,6,7-tetrahydrobenzothiazole nucleus and having the general formula:

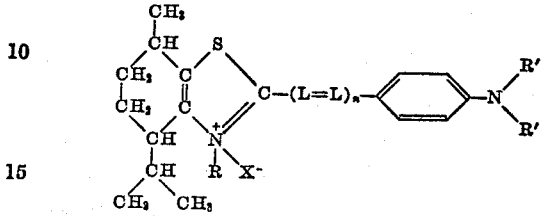

where R and R' respectively represent a member selected from the group consisting of alkyl and aralkyl groups, L represents a methine group, $n$ is a positive integer from 1 to 2 and X⁻ represents an anion comprising condensing a quaternary salt having the general formula:

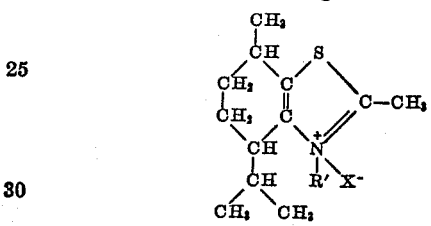

where R' represents a member selected from the group consisting of alkyl and aralkyl groups and X⁻ represents an acid radical with p-dialkyl aminobenzaldehyde in the presence of alkaline catalyst.

References Cited in the file of this patent

UNITED STATES PATENTS

| | | |
|---|---|---|
| 2,166,736 | White et al. | July 18, 1939 |
| 2,263,749 | White et al. | Nov. 25, 1941 |
| 2,320,654 | Riester | June 1, 1943 |
| 2,322,015 | Hamer et al. | June 15, 1943 |
| 2,330,203 | Brooker et al. | Sept. 28, 1943 |
| 2,336,463 | Brooker et al. | Dec. 14, 1943 |
| 2,336,843 | Brooket et al. | Dec. 14, 1943 |
| 2,338,782 | Riester | Jan. 11, 1944 |
| 2,340,882 | Kendall | Feb. 8, 1944 |
| 2,353,164 | Kendall et al. | July 11, 1944 |
| 2,495,260 | Jennen et al. | Jan. 25, 1950 |

OTHER REFERENCES

Chemical Abstracts, 16:3101 (Copy in S.L.) (Abstract of Brit. Med. Journal, 1922, I, 514–515).

Chemical Abstracts, 19:530 (Copy in S.L.) (Abstract of Proc. Roy. Soc., London 96B, 317–333, 1924).

Clerc: "Photography Theory and Practice," 3rd ed. page 151, Pitman Publ. Corp., N.Y., 1942.